United States Patent [19]

Hewitt

[11] Patent Number: 4,640,326
[45] Date of Patent: Feb. 3, 1987

[54] STAND FOR A TABLE SAW

[76] Inventor: Timothy W. Hewitt, 18 Kensington, Pleasant Ridge, Mich. 48069

[21] Appl. No.: 694,603

[22] Filed: Jan. 24, 1985

[51] Int. Cl.⁴ .............................................. B25H 1/00
[52] U.S. Cl. ..................................... 144/287; 108/48; 108/134; 83/477.2; 144/286 R; 248/240.4; 269/289 MR; 269/901
[58] Field of Search ............... 144/286 R, 286 A, 287; 108/48, 134; 83/477.2; 269/901, 289; 248/240.4, 240.2, 240; D6/400, 422, 429, 431

[56] References Cited

U.S. PATENT DOCUMENTS

| | | | |
|---|---|---|---|
| 2,481,654 | 9/1949 | Fuller | 22/112 |
| 2,490,588 | 12/1949 | Frie et al. | 248/240.4 |
| 2,577,399 | 12/1951 | Bell | 248/240.4 |
| 2,633,221 | 3/1953 | Roeder | 193/35 |
| 2,699,188 | 1/1955 | Caldwell | 143/132 |
| 2,722,243 | 11/1955 | Nagy | 144/286 R |
| 3,787,039 | 1/1974 | Zeichman | 269/13 |
| 4,039,064 | 8/1977 | Kirby | 193/42 |
| 4,248,115 | 2/1981 | Brodbeck et al. | 144/286 R |
| 4,406,200 | 9/1983 | Kerr | 144/287 |

FOREIGN PATENT DOCUMENTS 2407013  8/1975  Fed. Rep. of Germany ... 144/286 R

OTHER PUBLICATIONS

Brochure of HTC Products, Inc. 1984.

Primary Examiner—W. D. Bray
Attorney, Agent, or Firm—Gifford, Groh, VanOphem, Sheridan, Sprinkle and Dolgorukov

[57]  ABSTRACT

The present invention provides an improved stand for a table saw which has an upper work supporting surface. The stand comprises a generally rectangular frame having a top, bottom, two spaced sides and two spaced ends. The table saw is secured to the top of the frame while a pair of elongated supports are secured to one end of the frame so that the supports are spaced apart and parallel to each other. A platform containing a plurality of rollers is pivotally mounted to the supports and is pivotal between an upper and a lower position. In its upper position, an upper surface of each roller on the platform is coplanar with the table saw work supporting surface so that work can be slid from the platform and to the table saw or vice versa. Conversely, in its lower position, the platform is flush against the end of the frame for compact storage. A locking lever retains a platform in its upper position when desired.

5 Claims, 3 Drawing Figures

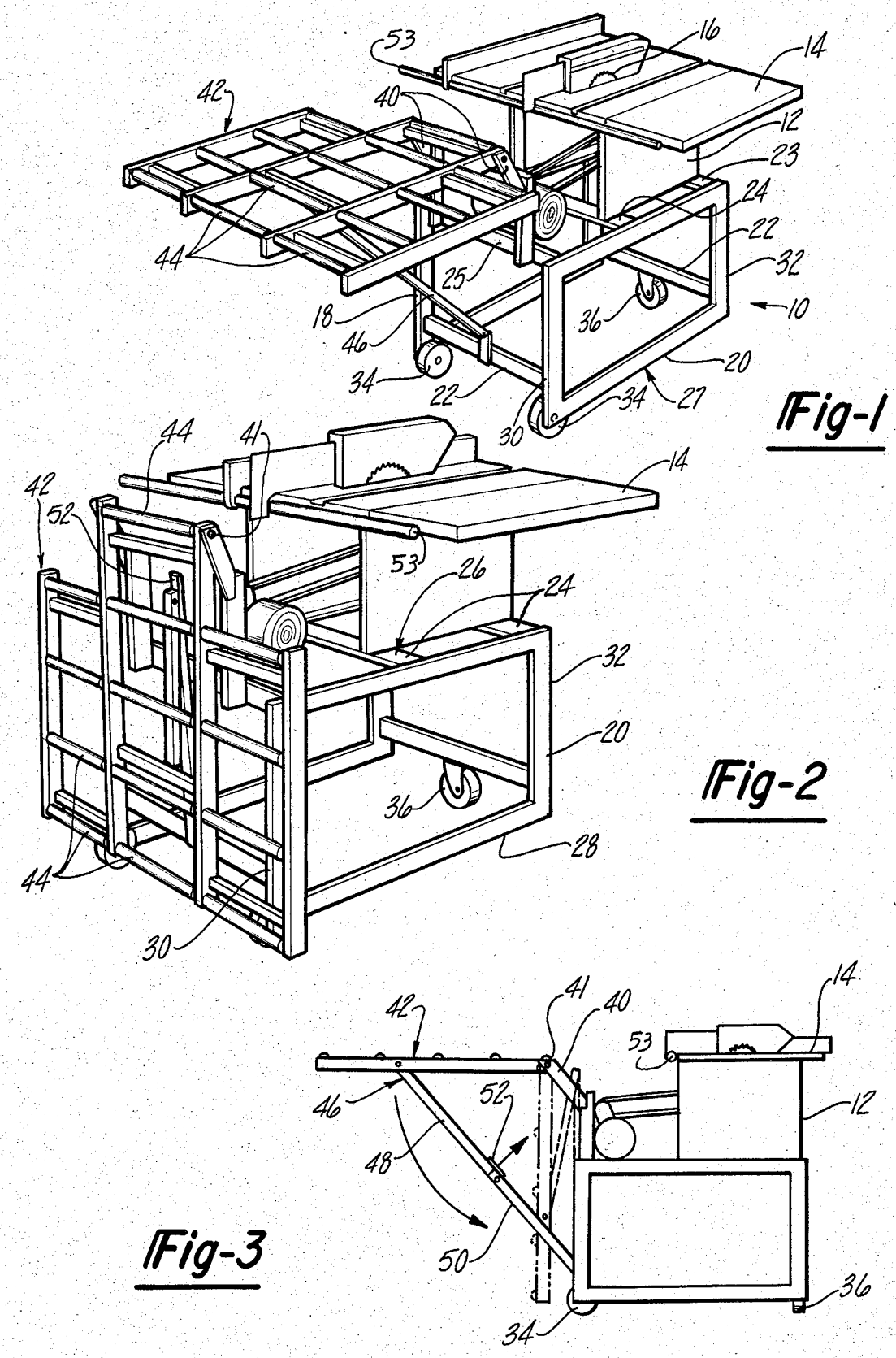

STAND FOR A TABLE SAW

BACKGROUND OF THE INVENTION

I. Field of the Invention

The present invention relates generally to a stand for a table saw.

II. Description of the Prior Art

The previously known table saws for cutting wood typically include an upper work supporting surface which is supported in a generally horizontal plane. The saw blade protrudes upwardly through the surface through a slot in the table.

The primary disadvantage of these previously known table saws is that the work supporting surface is relatively small so that it is difficult to maneuver large pieces of wood, such as a sheet of plywood on the table. Although it is possible to build an auxiliary table adjacent the saw table, such auxiliary tables consume a great deal of space and are impractical where only limited space is available in the shop area.

A further disadvantage of these previously known table saws is that the saw table, as well as any auxiliary table, is immobile. In many situations, it would be highly desirable to be able to move the saw table either with or without the auxiliary table to different locations in the shop area as dictated by the job requirements.

In one type of previously known auxiliary table, the auxiliary table is pivotally mounted on one side of the table saw and movable between a vertical storage position and a horizontal in use position. This previously known device, however, still lacks the desired mobility and is insufficiently sturdy for some applications.

SUMMARY OF THE PRESENT INVENTION

The present invention provides a stand for a table saw which overcomes all of the above mentioned disadvantages of the previously known devices.

In brief, the stand according to the present invention comprises a generally rectangular frame having a top, bottom, spaced side and two spaced ends. The table saw together with the work supporting surface is mounted to the top of the frame so that its work supporting surface lies in a generally horizontal plane. In addition, a plurality of lockable wheels are mounted to the bottom of the frame to support the frame on a ground support surface. The wheels enable the frame together with the table saw to be moved to any desired position and the wheels are then locked against further rotation.

A pair of supports are attached to one end of the frame so that the supports are spaced apart and parallel to each other. Furthermore, the upper ends of the supports angle outwardly from the frame and are substantially coplanar with the work support surface of the table saw.

A platform having a plurality of spaced rollers is pivotally mounted to the supports so that the platform is movable between an upper position and a lower position. In its upper position, an upper surface of each roller is coplanar with the work supporting surface of the table so that work can be slid from the platform and onto the table saw work supporting surface or vice versa. A locking lever retains the platform in its upper position when desired. Conversely, in its lower position the platform depends downwardly from the supports so that the platform is substantially flush against the end of the frame for compact storage of the table saw and stand.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a perspective view illustrating a preferred embodiment of the present invention and with the platform in its upper position;

FIG. 2 is a view similar to FIG. 1 but showing the platform in its lower position; and FIG. 3 is a side diagrammatic view of the preferred embodiment of the invention.

DETAILED DESCRIPTION OF A PREFERRED EMBODIMENT OF THE INVENTION

With reference first to FIG. 1, a preferred embodiment of the stand 10 of the present invention is thereshown for supporting a table saw 12. The table saw 12 is conventional in construction and includes an upper work supporting surface 14. A saw blade 16 protrudes upwardly through a slot in the table and above the surface 14.

With reference now to FIGS. 1 and 2, the stand 10 comprises a pair of generally rectangular spaced apart sides 18 and 20, both of which are constructed from elongated metal framing members. A pair of lower cross members 22 as well as three upper cross members 23, 24 and 25 extend in between and are secured to the sides 18 and 20 by any conventional means, such as welding to form a generally box-like frame 27 having a top 26, a bottom 28 and two ends 30 and 32.

The table saw 12 is positioned on the top surface 26 of the stand 10 and thus on top of the upper cross members 23 and 24. The table saw 12 is secured to the cross members 23 and 24 in any conventional fashion, such as by bolts (not shown). Since the cross members 23 and 24 lie generally in a horizontal plane, the stand 10 maintains the work supporting surface 14 of the table saw 12 in a horizontal plane and at a position spaced upwardly from the top 26 of the stand 10.

Preferably a pair of wheels 34 are mounted to the frame 27 with one wheel 34 at the bottom of each side 18 and 20 adjacent its front end 30. In addition, a caster wheel 36 is attached to the lower cross member 22 adjacent the rear end 32 of the frame 27. The wheels 34 and 36 thus enable the stand 10 together with the table saw 12 to be moved on a ground support surface. In addition, conventional means, not shown, lock the wheels 34 and 36 against further rotation when the stand 10 is in the desired position.

With reference now to FIGS. 2 and 3, a pair of spaced apart and parallel supports 40 are secured to the upper cross member 25 so that an upper end of each support 40 is generally coplanar with the upper surface 14 of the table saw 12. In addition, as best shown in FIG. 3, these cross supports 40 angle outwardly away from the table saw 12 for a purpose to be subsequently described.

With reference to FIGS. 1-3, a generally rectangular and planar platform 42 is pivotally mounted to the upper ends of the supports 40 by pivot pins 41 (FIGS. 2 and 3) so that the platform 42 is pivotal from a lower position, shown in FIG. 2, to an upper position shown in FIG. 1. The platform 42 includes a plurality of spaced rollers 44 having an upper surface which is substantially coplanar with the work support surface 14 when the platform 42 is in its upper position (FIG. 1).

With reference now particularly to FIGS. 1 and 3, an elongated latch bar 46 is provided for locking the platform 42 when desired in its upper position. The latch bar 46 includes a first part 48 which is pivotally mounted at one end to one end of a second part 50 of the latch bar 46. The other end of the first part 48 is pivotally mounted to the platform 42 while the other end of the second part 50 is pivotally mounted to the lower cross member 22 (FIG. 1). A keeper plate 52 (FIGS. 2 and 3) prevents the latch bar parts 48 and 50 from pivoting with respect to each other past the position shown in solid line in FIG. 3 thus maintaining the upper surface of the rollers 44 coplanar with the work support surface 14 of the table saw 12 in the desired fashion. Conversely, with the latch bar parts 48 and 50 pivoted to the position shown in phantom line in FIG. 3, and thus with the platform 42 in its lower position, the latch bar 46 is sandwiched in between the platform 42 and the frame 27 while the platform 42 is substantially flush against the end 30 of the frame 27 for compact storage.

In operation and assuming that the platform 42 is in its lower or storage position, when use of the table saw 12 is desired the stand 10 is rolled on the ground support surface by the wheels 34 and 36 to the desired position. When in the desired position, the wheels 34 and 36 are locked against further rotation.

The platform 42 is then moved from its lower or storage position as shown in FIG. 2 and to its upper position shown in FIG. 1 at which time the length bar 46 maintains the platform 42 in its upper position. Since the upper surface of the platform rollers 44 is coplanar with the upper work supporting surface 14 on the table saw 12, work can be slid either from the work support surface 14 onto the platform 42, or vice versa, in order to perform the cutting operation. An elongated tube 53 is preferably attached to the table saw 12 between the saw 12 and the end 30 of the stand 10 so that the upper surface of the tube 53 is coplanar with the surface 14. The tube 53 facilitates sliding the work between the platform 42 and the work support surface 14.

When use of the table saw 12 is no longer desired, the latch bar 46 is pivoted upwardly thus allowing the platform 42 to drop to its lower position in which the platform 42 is substantially flush against the frame 27 since the supports 40 angle outwardly away from the frame 27. The stand 10, including platform 42 and the table saw 12 can then be rolled by the wheels 34 and 36 to the desired storage location.

From the foregoing, it can be seen that the present invention provides a stand 10 for a table saw 12 which is both mobile and capable of assuming a compact storage position. Furthermore, the platform 42 allows large pieces of work, such as sheets of plywood, to be easily manipulated and cut by the table saw 12.

Having described my invention, however, many modifications thereto will become apparent to those skilled in the art to which it pertains without deviation from the spirit of the invention as defined by the scope of the appended claims.

I claim:

1. A stand for a table saw having a work support surface, said stand comprising,
    a generally rectangular frame having a top, bottom, two spaced sides and two spaced ends, constructed from rigidly connected elongated framing members,
    a pair of elongated supports which angle outwardly away from said frame,
    means securing said supports to one end of said frame so that said supports are spaced apart and parallel to each other and so that one end of each support is spaced above said top and is spaced outwardly from said one end by a predetermined distance,
    a planar platform having a plurality of spaced rollers,
    means pivotally securing said platform to said ends of said supports, said platform being pivotal between an upper position in which an upper surface of each roller is substantially coplanar with said work support surface and a lower position in which said platform is substantially flush against said end of said frame, and
    means connecting said frame and said platform for locking said platform in said upper position,
    wherein said supports are rigidly secured to at least one of said members at the top of said frame.

2. The invention as defined in claim 1 and comprising a plurality of wheels secured to the bottom of said frame.

3. The invention as defined in claim 2 and comprising means for locking said wheels against rotation.

4. The invention as defined in claim 1 and comprising an elongated tube, means for securing said tube to said frame so that said tube is spaced in between said table saw and said platform and so that an upper surface of said tube is substantially coplanar with said work support surface.

5. The invention as defined in claim 1, wherein said table saw includes a generally planar table top, said table top being positioned above said top of said rectangular frame; wherein said one end of each of said supports is generally coplanar with said table top; and wherein said platform is secured to said supports at each of said one end of said supports.

* * * * *